(12) United States Patent
Dolgov et al.

(10) Patent No.: US 11,037,778 B1
(45) Date of Patent: Jun. 15, 2021

(54) UV LAMP

(71) Applicant: MOCON, INC., Minneapolis, MN (US)

(72) Inventors: Boris Dolgov, Broomfield, CO (US); Chris Fields, Anoka, MN (US)

(73) Assignee: Mocon, Inc., Minneapolis, MN (US)

( * ) Notice: Subject to any disclaimer, the term of this patent is extended or adjusted under 35 U.S.C. 154(b) by 0 days.

(21) Appl. No.: 17/149,098

(22) Filed: Jan. 14, 2021

(51) Int. Cl.
| | |
|---|---|
| G01N 27/64 | (2006.01) |
| H01J 61/44 | (2006.01) |
| H01J 61/16 | (2006.01) |
| H01J 61/12 | (2006.01) |
| F21K 2/08 | (2006.01) |

(52) U.S. Cl.
CPC ............. *H01J 61/44* (2013.01); *F21K 2/08* (2013.01); *G01N 27/64* (2013.01); *H01J 61/125* (2013.01); *H01J 61/16* (2013.01)

(58) Field of Classification Search
CPC .......... H01J 61/44; H01J 61/125; H01J 61/16; G01N 27/64; F21K 2/08
See application file for complete search history.

(56) References Cited

U.S. PATENT DOCUMENTS

| | | | |
|---|---|---|---|
| 3,749,467 A | 7/1973 | Emidy et al. | |
| 3,946,262 A | 3/1976 | Keeffe et al. | |
| 4,810,924 A | 3/1989 | Jelic | |
| 4,818,915 A | 4/1989 | Zaslaysky et al. | |
| RE33,415 E | 10/1990 | Jelic | |
| 5,017,831 A | 5/1991 | Bouchard et al. | |
| 5,444,331 A | 8/1995 | Matsuno et al. | |
| 6,646,444 B2* | 11/2003 | Dolgov | G01N 27/66 250/382 |
| 7,595,593 B2* | 9/2009 | Genz | H01J 61/125 313/539 |
| 2005/0062398 A1 | 3/2005 | Yoshida et al. | |
| 2005/0218811 A1 | 10/2005 | Schulman | |
| 2006/0226781 A1 | 10/2006 | Allen et al. | |
| 2006/0290285 A1 | 12/2006 | Lapatovich et al. | |
| 2011/0101858 A1 | 5/2011 | Hombach et al. | |
| 2012/0318996 A1* | 12/2012 | Dolgov | H01J 65/046 250/372 |

FOREIGN PATENT DOCUMENTS

| | | | |
|---|---|---|---|
| DE | 19820906 A1 | 11/1998 | |
| DE | 10325552 A1 * | 12/2004 | ............. H01J 61/26 |
| EP | 059581 A1 | 1/1994 | |

(Continued)

*Primary Examiner* — Donald L Raleigh
(74) *Attorney, Agent, or Firm* — Sherrill Law Offices, PLLC

(57) ABSTRACT

A gas discharge lamp and photoionization sensor employing the gas discharge lamp. The lamp includes a housing containing a working gas sealed within the housing and a primary ultra-violet transparent window through a first longitudinal end of the housing. In a first embodiment the lamp includes an arched band of elastic getter material band with longitudinally extending diametrically opposed legs wedged within the chamber defined by the housing. In a second embodiment the lamp includes a second ultra-violet transparent window within the housing held into positon against the primary ultra-violet transparent window by an arched metal support band within the housing.

18 Claims, 4 Drawing Sheets

(56) References Cited

FOREIGN PATENT DOCUMENTS

| | | |
|---|---|---|
| EP | 2535922 B1 | 4/2015 |
| GB | 2424755 A | 10/2006 |
| GB | 2484738 A | 4/2012 |
| JP | 02094230 | 4/1990 |
| JP | 10308174 | 11/1998 |
| JP | 11250807 | 9/1999 |
| JP | 11339729 | 12/1999 |
| JP | 2001250503 | 9/2001 |
| JP | 2003215103 | 7/2003 |
| JP | 2007005317 | 1/2007 |
| JP | 2007173090 | 7/2007 |
| JP | 2010256165 | 11/2010 |

\* cited by examiner

UV LAMP

BACKGROUND

Gas discharge lamps are used in a wide variety of applications to emit radiation falling within a defined band width. Such lamps are frequently used in analytical chemistry instrumentation, in particular gas sensors based on the photoionization principle, known as Photoionization Detectors (PIDs). In one of the common designs, radiation is emitted by the lamp by capacitively exciting a working gas retained within the lamp with a pair of excitation electrodes diametrically positioned on opposite sides of the lamp. One such gas discharge lamp is described in U.S. Pat. No. 6,646,444, the disclosure of which is incorporated herein by reference. Alternatively, the working gas can be inductively excited. As disclosed in U.S. Pat. No. 6,646,444, a preferred working gas is Krypton.

In order to maintain proper performance of a gas discharge lamp, the working gas needs to remain relatively pure. Contamination of the working gas within the lamp, such as from residual gases remaining within the lamp during manufacture or gradual release of adsorbed gases into the lamp, decreases operability and performance.

It is customary to incorporate a getter into gas discharge lamps in order to reduce or eliminate contamination gases within the lamp. Getters function by chemically combining with or adsorbing contaminant gases, thereby preventing them from interfering with excitation of and emissions from the working gas.

Getters can interfere with ignition of the gas discharge lamp when positioned between the electrodes on the lamp, and can interfere with ultraviolet (UV) light propagation if positioned over the UV window of the lamp. Hence, the getter should be positioned within the lamp so as to avoid positioning of the getter between the electrodes or over the UV window, and should be fixed into this out-of-the-way position. One technique for accomplishing this is disclosed in U.S. Pat. No. 9,368,338 wherein one end of the getter strip is embedded into the closed end of the lamp housing.

The technique disclosed in U.S. Pat. No. 9,368,338 is a significant advance over prior efforts but suffers certain drawbacks, such as a loss of control over the final shape of the lamp housing and inconsistent location of the getter within the lamp's body. Hence, a need still exists for alternative methods of fixedly incorporating a getter into a UV lamp.

The range of detectable gaseous volatile organic compounds (VOC) for a VOC gas detection sensor which uses photoionization is controlled by the electron volt (eV) energy which is emitted from the lamp. The eV rating of the lamp is a function of both the type of fill gas used by the lamp and the methods of spectrum filtering applied to the lamp.

A typical krypton gas filled lamp used for the purpose of photoionization detection has an eV rating of 10.6, or simply stated as "10.6 eV". This means that the detection sensor is able to detect the presence of any and all VOC gases which have an ionization potential of 10.6 or lower.

For certain applications it is desirable to limit the range of detectable VOC gases by filtering some of the energy emitted from the lamp. One approach to this is the addition of a calcium fluoride window to the lamp. Calcium fluoride crystal is transparent for a smaller band of UV wavelengths than the standard magnesium fluoride crystal window employed on lamps. Thus, the addition of a calcium fluoride window in some fashion to the typical 10.6 eV UV lamp will change its rating from 10.6 eV to 10.0 eV.

The typical method to add the calcium fluoride window is to attach the window directly to the top of the magnesium fluoride window by epoxy, cement, gluing, etc. This method of attaching the calcium fluoride window suffers several drawbacks including damage to the fragile calcium fluoride window and/or the fragile magnesium fluoride window during attachment of the calcium fluoride window, detachment of the calcium fluoride window and/or the magnesium fluoride window from the lamp, and a risk that cleaning fluids used to clean the lamp will be drawn between the two windows and significantly block UV transmission through the windows.

Hence, a substantial need exists for a 10.0 eV lamp which avoids the drawbacks associated with traditional 10.0 eV lamps which secure the calcium fluoride window directly atop the magnesium fluoride window, without introducing other significant drawbacks.

SUMMARY OF THE INVENTION

A first aspect of the invention is an ultraviolet gas discharge lamp.

A first embodiment of the first aspect of the invention is a gas discharge lamp with an enclosed getter. The lamp includes a housing, an ultra-violet transparent window, working gas, and an arched band of elastic getter material. The housing, preferably glass, defines a longitudinal axis and has a chamber of defined contour with an opening at a longitudinal end. The ultra-violet transparent window sealingly covers the opening in the housing so as to hermetically seal the chamber. The working gas is sealed within the chamber. The arched band of elastic getter material is positioned within the chamber with diametrically opposed longitudinally extending legs, each with an end proximate the ultra-violet transparent window and each biased outward into engagement with the housing whereby the band is wedged within the chamber.

A second embodiment of the first aspect of the invention is a dual window gas discharge lamp. The lamp includes a housing, a first ultra-violet transparent window, working gas, an arched metal support band, and a second ultra-violet transparent window. The housing, preferably glass, defines a longitudinal axis and has a chamber of defined contour with an opening at a longitudinal end. The first ultra-violet transparent window is constructed from a first material and sealingly covers the opening in the housing so as to hermetically seal the chamber. The working gas is sealed within the chamber. The arched metal support band is positioned within the chamber with diametrically opposed longitudinally extending legs, each with an end proximate and longitudinally offset from the first ultra-violet transparent window. The second ultra-violet transparent window is constructed from a second material different from the first material, and is entrapped within the chamber between the first ultra-violet transparent window and the ends of the arched metal support band.

The ultraviolet gas discharge lamp of both embodiments can include a pair of metal excitation electrodes diametrically positioned about the longitudinal axis on or within the housing.

A second aspect of the invention is a photoionization sensor that includes an ultraviolet gas discharge lamp according to the first aspect of the invention.

DETAILED DESCRIPTION OF A PREFERRED EMBODIMENT

Nomenclature

Figure 1:
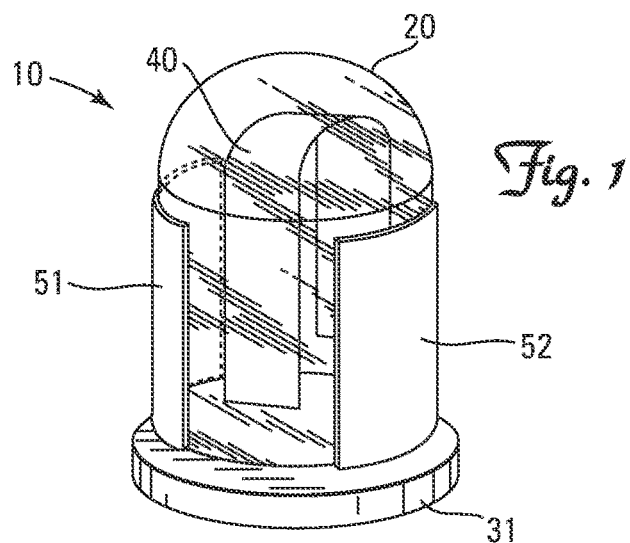
FIG. 1 is an isometric view of one embodiment of the invention.
Figures 2, 3:
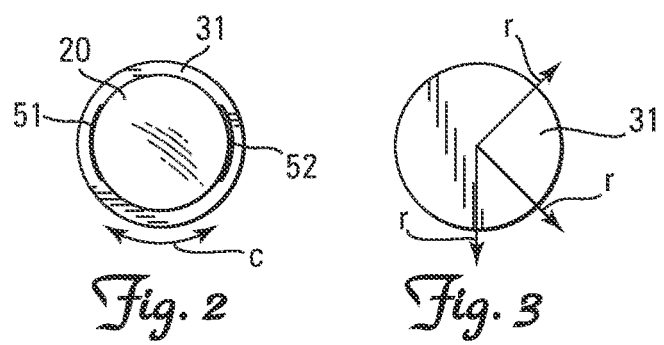
FIG. 2 is a bottom view of the invention depicted in FIG. 1.
FIG. 3 is a top view of the invention depicted in FIG. 1.
Figures 4, 5:
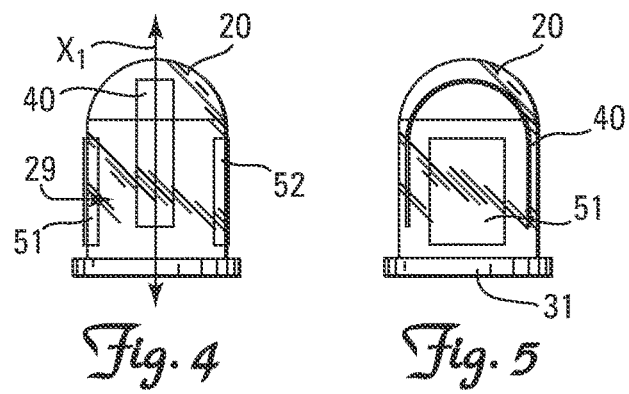
FIG. 4 is a front view of the invention depicted in FIG. 1.
FIG. 5 is a right side view of the invention depicted in FIG. 1.
Figures 6, 7:
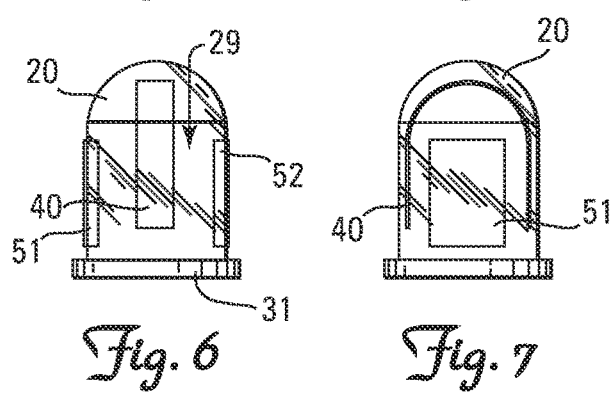
FIG. 6 is a rear view of the invention depicted in FIG. 1.
FIG. 7 is a left side view of the invention depicted in FIG. 1.

10 Ultraviolet Gas Discharge Lamp
20 Lamp Housing
21 First Longitudinal End of Lamp Housing
22 Second Longitudinal End of Lamp Housing
28 Opening through First Longitudinal End of Lamp Housing
29 Chamber of Lamp Housing
30 Ultra Violet Transparent Window
31 Primary Ultra Violet Transparent Window
32 Secondary Ultra Violet Transparent Window
32c Circumferential Edge of Secondary Ultra Violet Transparent Window
40 Band
40' Getter Band
40" Support Band
41 First Leg of Band
41d Distal End of First Leg of Band
41t Tab Formed at Distal End of First Leg of Support Band
42 Second Leg of Band
42d Distal End of Second Leg of Band
42t Tab Formed at Distal End of Second Leg of Support Band
43 Curved Section of Band
50 Excitation Electrodes
51 First Excitation Electrode
52 Second Excitation Electrode
60 Working Gas
$x_1$ Longitudinal Axis of Housing
r Radial Direction from Longitudinal Axis of Housing
c Circumferential Direction around Longitudinal Axis of Housing

Construction

First Embodiment

Referring to FIGS. 1-7, a first embodiment of the first aspect of the invention is a gas discharge lamp 10, and in particular an ultraviolet discharge lamp 10 suitable for use in a photoionization sensor (not shown). The lamp 10 includes a housing 20, an ultraviolet transparent window 30, a getter band 40', and a working gas 60. The lamp 10 can also include a pair of metal excitation electrodes 51 and 52 (collectively referenced as electrodes 50) diametrically positioned about the longitudinal axis $x_1$ of the housing 20 on or within the housing 20. The electrodes 50, when attached to the lamp 10, are preferably attached to the outside surface of the housing 20.

The housing 20 is preferably constructed of glass, defines a longitudinal axis $x_1$ and has a first longitudinal end 21, a second longitudinal end 22, and a chamber 29 of defined contour with an opening 28 into the chamber 29 through the first longitudinal end 21.

The ultra-violet transparent window 30 is constructed from a UV transparent material, typically magnesium fluoride crystals. The ultra-violet transparent window 30 is sealingly attached to the housing 20 over the opening 28 so as to hermetically seal the chamber 29.

Figure 8:
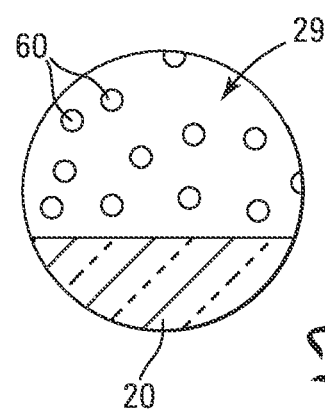
FIG. 8 is a grossly enlarge portion of the invention shown in FIG. 7 permitting depiction of the working gas on a molecular level.

Referring to FIG. 8, working gas 60, typically a noble gas such as krypton, is sealed within the chamber 29. Hydrogen can also be used as the working gas 60.

Figures 9, 10:
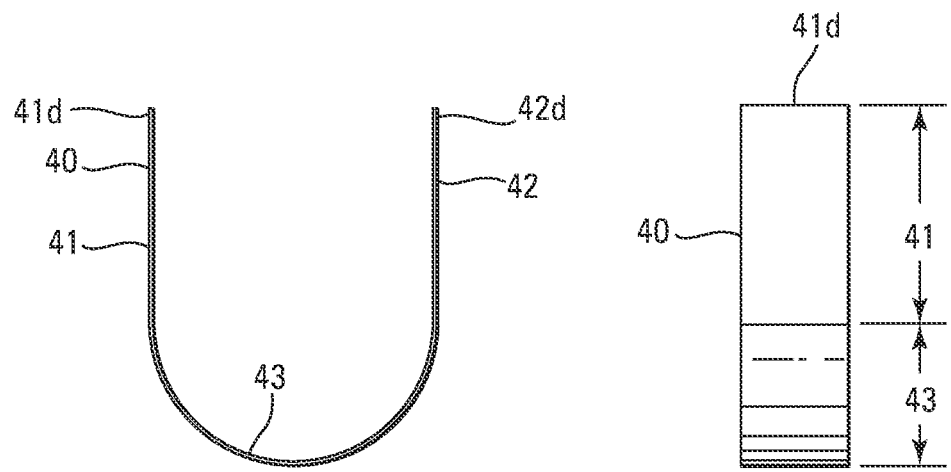
FIG. 9 is a front view of the getter band shown in FIG. 1.
FIG. 10 is a side view of the getter band shown in FIG. 1.
Figure 11:
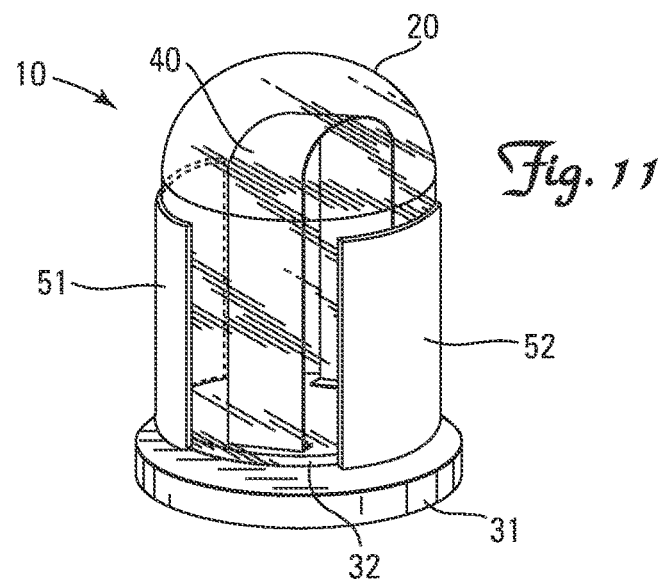
FIG. 11 is an isometric view of one embodiment of the invention.
Figure 12:
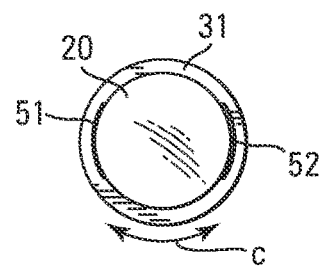
FIG. 12 is a bottom view of the invention depicted in FIG. 11.
Figure 13:
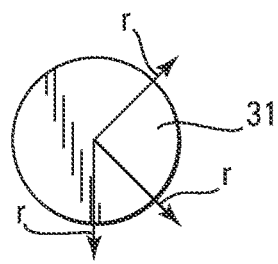
FIG. 13 is a top view of the invention depicted in FIG. 11.
Figure 14:
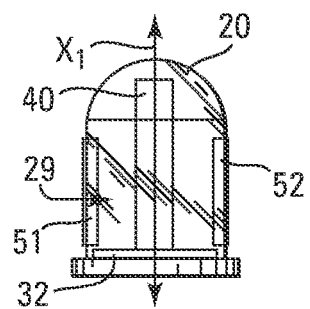
FIG. 14 is a front view of the invention depicted in FIG. 11.
Figure 15:
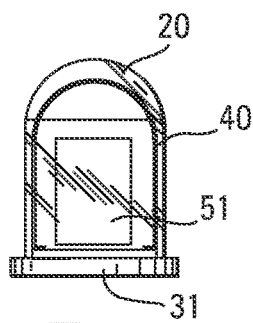
FIG. 15 is a right side view of the invention depicted in FIG. 11.
Figure 16:
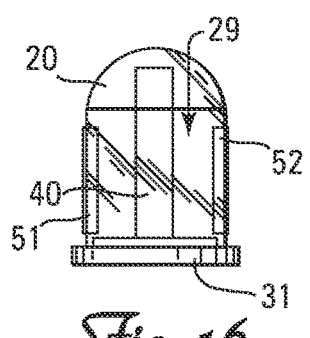
FIG. 16 is a rear view of the invention depicted in FIG. 11.
Figure 17:
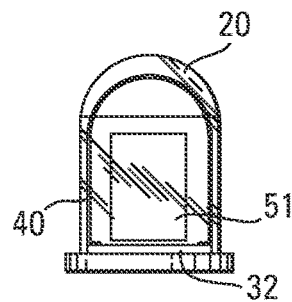
FIG. 17 is a left side view of the invention depicted in FIG. 11.

Referring to FIGS. 9 and 10, the getter band 40' is constructed from an elastic getter material with a pair of diametrically opposed first and second legs 41 and 42, interconnected at a proximal end (unnumbered) by a curved section 43 and each having a distal end 41d and 42d respectively. The contour of the getter band 40' preferably corresponds to the contour of the chamber 29 with a spacing between the distal ends 41d and 42d of the getter band 40' that is slightly larger than the diameter of the chamber 29 so that the getter band 40' is elastically biased against the walls of the housing 20 so as to wedge the getter band 40' in a fixed position within the chamber 29.

Referring to FIGS. 1 and 4-7, the getter band 40' is positioned within the chamber 29 with the distal ends 41d and 42d proximate the ultra-violet transparent window 30.

The getter band 40' is constructed from an oxidizable metal getter material such as titanium or a sintered getter alloy. The length of the getter band 40' (i.e., dimension that extends from distal end 41d to distal end 42d along the getter band 40') is that length capable of achieving a secure outwardly biased wedging of the getter band 40' within the chamber 29 without interfering with attachment of the ultra-violet transparent window 30 to the housing 20. Generally a length of about 6 to 12 mm and a width of about 1 to 2 mm is effective. A thickness in the radial direction r of about 0.05 to 0.3 mm is generally the cost-effective range for providing the structural integrity necessary to provide the necessary measure of elasticity to the getter band 40' so as to wedge the getter band 40' within the chamber 29.

The legs 41 and 42 of the getter band 40' and the excitation electrodes 51 and 52 are preferably all uniformly circumferentially spaced relative to one another around the chamber 29 to minimize any interference the getter band 40' may impose upon excitation of the working gas 60 by the electrodes 50.

Second Embodiment

Referring to FIGS. 11-17, a second embodiment of the first aspect of the invention is a gas discharge lamp 10, and in particular an ultraviolet discharge lamp 10 suitable for use in a photoionization sensor (not shown). The lamp 10 includes a housing 20, a first or primary ultraviolet transparent window 31, a second or secondary ultraviolet transparent window 32, a support band 40", and a working gas 60. The lamp 10 can also include a pair of metal excitation electrodes 51 and 52 (collectively referenced as electrodes 50) diametrically positioned about the longitudinal axis $x_1$ of the housing 20 on or within the housing 20. The electrodes 50, when attached to the lamp 10, are preferably attached to the outside surface of the housing 20.

The housing 20 is preferably constructed of glass, defines a longitudinal axis $x_1$ and has a first longitudinal end 21, a second longitudinal end 22, and a chamber 29 of defined contour with an opening 28 into the chamber 29 through the first longitudinal end 21.

The first ultra-violet transparent window 31 is constructed from a first material, typically magnesium fluoride crystals. The first ultra-violet transparent window 31 is sealingly attached to the housing 20 over the opening 28 so as to hermetically seal the chamber 29.

Referring to FIG. 8, as with the first embodiment working gas 60, typically a noble gas such as krypton, is sealed within the chamber 29. Hydrogen can also be used as the working gas 60.

Figure 19:
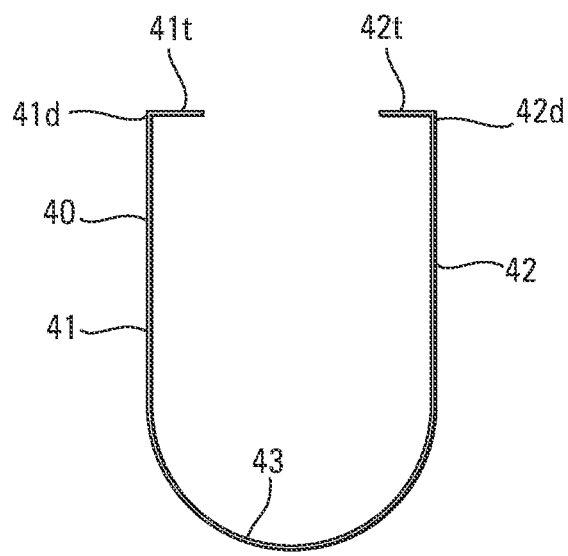
FIG. 19 is a side view of the support band shown in FIG. 11.
Figure 18:
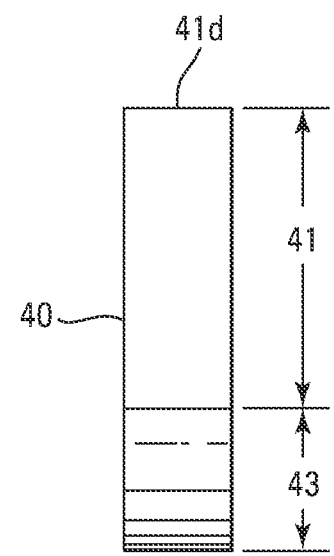
FIG. 18 is a front view of the support band shown in FIG. 11.

Referring to FIGS. 18 and 19, the arched support band 40" has a pair of diametrically opposed first and second legs 41 and 42, interconnected at a proximal end (unnumbered) by a curved section 43 and each having a distal end 41d and 42d respectively. The contour of the support band 40" preferably corresponds to the contour of the chamber 29. The support band 40", as with the getter band 40', may be constructed from an elastic material with a spacing between the distal ends 41d and 42d of the support band 40" that is slightly larger than the diameter of the chamber 29 so that the support band 40" is elastically biased against the walls of the housing 20 so as to wedge the support band 40" in a fixed position within the chamber 29.

Referring to FIGS. 11 and 14-17, the support band 40" is positioned within the chamber 29 with the distal ends 41d and 42d proximate and longitudinally offset from the first ultra-violet transparent window 31. The distal ends 41d and 42d of the legs 41 and 42 respectively, are each preferably bent inward towards the longitudinal axis $x_1$ of the housing 20 to create inwardly projecting support tabs 41t and 42t.

The support band 40" can be constructed from an oxidizable metal getter material such as titanium or a sintered getter alloy. The length of the support band 40" (i.e., dimension that extends from distal end 41d to distal end 42d along the band 40) is that length which is effective for firmly and securely holding the second ultra-violet transparent window 32 between the first ultra-violet transparent window 31 and the distal ends 41d and 42d of the arched metal support band 40. Generally, a length of about 6 to 12 mm and a width of 1 to 2 mm is effective. A thickness in the radial direction r of about 0.05 to 0.3 mm is generally the cost-effective range for providing the structural integrity necessary to support the second ultra-violet transparent window 32 in position.

Legs 41 and 42 of the support band 40 and the excitation electrodes 51 and 52 are preferably all uniformly circumferentially spaced relative to one another around the chamber 29 to minimize any interference the support band 40" may impose upon excitation of the working gas 60 by the electrodes 50.

Figure 20:
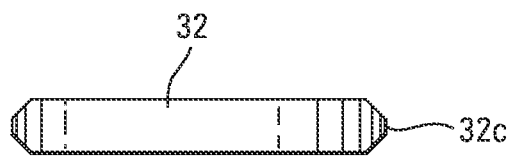
FIG. 20 is a side view of the secondary ultraviolet transparent window shown in FIG. 11.

Referring again to FIGS. 11-17, the second ultra-violet transparent window 32 is constructed from a second material different from the first material, such as calcium fluoride crystals. The second ultra-violet transparent window 32 is entrapped within the chamber 29 between the first ultra-violet transparent window 31 and the distal ends 41d and 42d of the support band 40". Referring to FIG. 20, the circumferential edge 32c of the second ultra-violet transparent window 32 is preferably chamfered on both the upper and lower (unnumbered) edges of the second window 32 to facilitate placement of the second window 32 into the chamber 29 through the opening 28 regardless of which side is inserted first, prior to attachment of the first ultra-violet transparent window 31 over the opening 28.

We claim:

1. An ultraviolet gas discharge lamp, comprising:
   (a) a housing having a longitudinal axis and a chamber of defined contour with an opening at a longitudinal end,
   (b) an ultra-violet transparent window covering the opening and sealed to the housing so as to hermetically seal the chamber,
   (c) a working gas sealed within the chamber, and
   (d) an arched band of elastic getter material positioned within the chamber with diametrically opposed longitudinally extending legs, each with an end proximate the ultra-violet transparent window and each biased outward into engagement with the housing whereby the band is wedged within the chamber.

2. The lamp of claim 1 further comprising a pair of metal excitation electrodes diametrically positioned about the longitudinal axis on or within the housing.

3. The lamp of claim 2 wherein the legs of the arched band and the excitation electrodes are all uniformly circumferentially spaced relative to one another around the chamber.

4. An ultraviolet gas discharge lamp, comprising:
   (a) a housing having a longitudinal axis and a chamber of defined contour with an opening at a longitudinal end,
   (b) a first ultra-violet transparent window constructed from a first material covering the opening and sealed to the housing so as to hermetically seal the chamber,
   (c) a working gas sealed within the chamber,
   (d) an arched metal support band positioned within the chamber with diametrically opposed longitudinally extending legs, each with an end proximate and longitudinally offset from the first ultra-violet transparent window, and
   (e) a second ultra-violet transparent window constructed from a second material different from the first material, entrapped within the chamber between the first ultra-violet transparent window and the ends of the arched metal support band.

5. The lamp of claim 4 further comprising a pair of metal excitation electrodes diametrically positioned about the longitudinal axis on or within the housing.

6. The lamp of claim 4 wherein the first material is magnesium fluoride.

7. The lamp of claim 6 wherein the second material is calcium fluoride.

8. The lamp of claim 4 wherein the working gas is krypton.

9. The lamp of claim 4 wherein the arched metal support band is a getter.

10. The lamp of claim 4 wherein the arched metal support band has a length that extends from end to end and a lengthwise contour that corresponds to the contour of the chamber.

11. The lamp of claim 4 wherein the arched metal support band has a thickness in a radial direction relative to the longitudinal axis of the housing of about 0.05 to 0.3 mm, and a width in a circumferential direction relative to the longitudinal axis of the housing of about 1 to 2 mm.

12. The lamp of claim 4 wherein the ends of the legs of the arched metal support band each bend inward towards the longitudinal axis of the housing to create inwardly projecting tabs operable for supporting the second ultra-violet transparent window.

13. The lamp of claim 5 wherein the legs of the arched metal support band and the excitation electrodes are all uniformly circumferentially spaced relative to one another around the chamber.

14. A photoionization sensor including an ultraviolet gas discharge lamp in accordance with claim 1.

15. A photoionization sensor including an ultraviolet gas discharge lamp in accordance with claim 4.

16. A photoionization sensor including an ultraviolet gas discharge lamp in accordance with claim 11.

17. A photoionization sensor including an ultraviolet gas discharge lamp in accordance with claim 12.

18. A photoionization sensor including an ultraviolet gas discharge lamp in accordance with claim 13.

\* \* \* \* \*